United States Patent
Shibayama et al.

(10) Patent No.: US 10,146,266 B2
(45) Date of Patent: Dec. 4, 2018

(54) ELECTRONIC APPARATUS

(71) Applicant: LENOVO (SINGAPORE) PTE. LTD., Singapore (SG)

(72) Inventors: Yoshiyuki Shibayama, Yokohama (JP); Hiroaki Agata, Yokohama (JP); Shigeki Mori, Yokohama (JP); Kimio Kumada, Yokohama (JP); Takane Fujino, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/679,803

(22) Filed: Aug. 17, 2017

(65) Prior Publication Data

US 2018/0074557 A1 Mar. 15, 2018

(30) Foreign Application Priority Data

Sep. 15, 2016 (JP) .................................. 2016-180668

(51) Int. Cl.
G06F 1/16 (2006.01)

(52) U.S. Cl.
CPC .......... *G06F 1/1662* (2013.01); *G06F 1/1616* (2013.01); *G06F 1/1618* (2013.01); *G06F 1/1666* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 5,659,307 A | * | 8/1997 | Karidis | G06F 1/1616 341/20 |
| 2011/0023272 A1 | * | 2/2011 | Huang | E05D 3/18 16/362 |
| 2011/0194237 A1 | * | 8/2011 | Weng | G06F 1/1616 361/679.08 |
| 2012/0134089 A1 | * | 5/2012 | Wu | G06F 1/169 361/679.4 |
| 2014/0240923 A1 | * | 8/2014 | Lin | G06F 1/203 361/679.55 |
| 2014/0299740 A1 | * | 10/2014 | Peng | G06F 1/1632 248/688 |

FOREIGN PATENT DOCUMENTS

JP 2016212722 A 12/2016

* cited by examiner

*Primary Examiner* — Courtney Smith
*Assistant Examiner* — Rashen E Morrison
(74) *Attorney, Agent, or Firm* — Shimokaji IP

(57) ABSTRACT

The present invention provides an electronic apparatus for reducing the load on mechanism parts and thickness, including a main unit chassis having keytops; a display chassis pivotably connected with the main unit chassis by hinge mechanisms; rubber domes urging the keytops in a direction to cause the keytops to project from an upper surface; an X slider sliding in the main unit chassis in synchronization with the pivoting movements of the main unit chassis and the display chassis; a key depressing mechanism and a link mechanism, causing the keytops to retract from the upper surface when the X slider slides in one direction, and causing the keytops to project from the upper surface when the X slider slides in the opposite direction; and an auxiliary elastic member urging the X slider in a direction to cause the X slider to slide in the one direction.

7 Claims, 11 Drawing Sheets

ELECTRONIC APPARATUS

FIELD OF THE INVENTION

The present invention relates to an electronic apparatus in which two chassis are pivotably connected by a hinge mechanism.

BACKGROUND OF THE INVENTION

The chassis of an electronic apparatus, such as a laptop personal computer (laptop PC) or a convertible tablet type personal computer (convertible PC), are rapidly becoming thinner. A laptop PC has a configuration in which, for example, a display chassis is connected to a main unit chassis such that the display chassis can be opened and closed with respect to the main unit chassis from about a zero-degree position to about a 180-degree position through a hinge mechanism. A convertible PC has a configuration in which a display chassis is connected to a main unit chassis such that the display chassis can be flipped from a zero-degree position to a 360-degree position with respect to the main unit chassis through a hinge mechanism.

Normally, the chassis of this type of electronic apparatus includes a keyboard assembly, which is provided with a plurality of keytops elastically supported so as to be vertically movable, and various function switches. The keyboard assembly, for example, is required to provide satisfactory keystrokes to secure great ease of operation, resulting in an increased thickness of the chassis. In addition, the keytops of the keyboard assembly usually project from a surface of the chassis, so that the keyboard assembly may interfere with the display assembly when the display chassis is closed. It has been necessary, therefore, to further increase the thickness of the chassis in order to avoid the interference.

Hence, the present applicant has proposed, in Patent Document 1, a configuration in which the keytops can be pushed down to be accommodated as a display chassis pivots. In this configuration, a key depressing mechanism which moves the keytops up or down in synchronization with the rotation of a hinge mechanism is provided, so that the keytops move down when the display chassis is closed and the keytops move up when the display chassis is opened. This arrangement enables the keyboard assembly to be substantially thinner and also ease of operation to be secured.

[Patent Document 1] Japanese Patent No. 5980374

Normally, keytops are urged upward by elastic members, such as rubber domes. In other words, according to the configuration described in Patent Document 1 mentioned above, the keytops must be moved down against the urging force of the rubber domes when depressing the keytops. On the other hand, when moving the keytops upward, the urging force of the rubber domes will be an assist force.

Thus, in the foregoing key depressing mechanism, there is a significant difference between the load applied when the keytops descend and the load applied when the keytops ascend. This means that the key depressing mechanism and the hinge mechanism interlocked with the key depressing mechanism are subjected to high load at the descent, leading to a danger of damage or malfunction. A solution to this problem would require increasing the size and the strength of the components constituting the key depressing mechanism and the hinge mechanism interlocked with the key pressing mechanism. This, however, would impede achieving a thinner design. In addition, various function switches and the like other than the keyboard assembly may have the same problem.

SUMMARY OF THE INVENTION

The present invention has been made to overcome the shortcoming with the prior art described above, and it is an object of the invention to provide an electronic apparatus capable of reducing the load applied to mechanism parts and also achieving a reduction in thickness.

An electronic apparatus according to the first aspect of the present invention includes: a first chassis having a movable member provided such that the movable member can be projected or retracted in relation to an outer surface; a second chassis pivotably connected with the first chassis by a hinge mechanism; an elastic member which urges the movable member in a direction for projecting from the outer surface; a projecting/retracting mechanism which has a sliding member that slides in the first chassis in synchronization with the pivoting movements of the first chassis and the second chassis and which retracts the movable member from the outer surface against an urging force of the elastic member in the case where the sliding member slides in one direction, while projecting the movable member from the outer surface in the case where the sliding member slides in the other direction; and an auxiliary elastic member which urges the sliding member in a direction that causes the sliding member to slide in the one direction.

With this arrangement, when the first chassis and the second chassis pivot through the hinge mechanism, the projecting/retracting mechanism is actuated thereby to project or retract the movable member in relation to the outer surface of the first chassis. At this time, for the movable member to retract, the sliding member is required to be slid in one direction against the urging force of the elastic member so as to retract the movable member. For this reason, the electronic apparatus is provided with an auxiliary elastic member which urges the sliding member in a direction that cancels out the urging force from the elastic member. In other words, the auxiliary elastic member urges the sliding member in a direction for retracting the movable member. This makes it possible to reduce the load applied to the projecting/retracting mechanism when the movable member retracts. To project the movable member, the sliding member is required to be slid against the urging force of the auxiliary elastic member. However, the urging force of the auxiliary elastic member can be canceled out by the urging force of the elastic member when projecting the movable member. As a result, breakage or malfunction of the mechanism parts constituting the projecting/retracting mechanism can be suppressed without increasing the size or the strength of the mechanism parts. Thus, the chassis of the electronic apparatus can be made thinner and smaller.

The first chassis may have a keyboard assembly, the second chassis may have a display assembly, and the movable member may be composed of a keytop of the keyboard assembly. In a typical keyboard assembly, the keytops are urged upward by elastic members, such as rubber domes. According to the electronic apparatus, therefore, the urging force in the direction opposite from the direction of the urging force imparted by the elastic member is applied to the sliding member by the auxiliary elastic member, thus permitting a reduction in the load applied to the entire projecting/retracting mechanism.

The hinge mechanism may be configured to connect the first chassis and the second chassis such that the first chassis and the second chassis are pivotable from a zero-degree position where the front surface of the keyboard assembly of the first chassis and the front surface of the display assembly of the second chassis oppose each other to a 360-degree position where the rear surface of the keyboard assembly of the first chassis and the rear surface of the display assembly of the second chassis oppose each other, and the keytop may be configured to be in a depressed position where the keytop is retracted from the outer surface at the zero-degree position and the 360-degree position, and to be in a position where the keytop is projected from the outer surface to be in a use position where the keytop can be vertically moved while being elastically supported by the elastic member within a predetermined angle range set between the zero-degree position and a 180-degree position.

The hinge mechanism may be configured to have a first shaft unrotatably fixed with respect to the first chassis, a second shaft unrotatably fixed with respect to the second chassis, and a hinge chassis which rotatably supports the first shaft and the second shaft. The projecting/retracting mechanism may be configured to include: a cylindrical cam member which is disposed on the outer peripheral surface of the first shaft in a coaxial manner and is disposed rotatably with respect to the first shaft, which is provided to be integrally rotatable with the hinge chassis with respect to the first shaft, which is provided with a first cam surface on one end and which is provided with a second cam surface on the other end; and a cylindrical connecting section which is provided to be slidable integrally with the sliding member, which is coaxially disposed to be movable in an axial direction with respect to the first shaft on the outer peripheral surface of the first shaft, and which is provided with a first pressure receiving surface that can be in sliding contact with the first cam surface and a second pressure receiving surface that can be in sliding contact with the second cam surface. The sliding member may be configured to slide in the other direction by the first pressure receiving surface being pressed by the first cam surface of the cylindrical cam member rotating on the outer peripheral surface of the first shaft, and to slide in the one direction by the second pressure receiving surface being pressed by the second cam surface of the cylindrical cam member. Thus, the large contact areas provided by the cam surfaces and the pressure receiving surfaces can be secured for the transmission between the cylindrical cam member and the cylindrical connecting section, which interlock the slide of the sliding member that projects or retracts the movable member with the rotation of the hinge mechanism. This makes it possible to reliably receive the load that takes place between the cylindrical cam member and the cylindrical connecting section, thus permitting suppressed occurrence of breakage, wear or the like.

The projecting/retracting mechanism may be configured to include a second sliding member, which slides in a direction that intersects with the sliding member in synchronization with a slide of the sliding member, and a driving member, which projects or retracts the movable member in relation to the outer surface in the case where the second sliding member slides.

According to the aspect of the present invention, breakage or malfunction of the mechanism parts constituting the projecting/retracting mechanism, which projects or retracts the movable member, can be suppressed without increasing the size or the strength of the mechanism parts. Thus, the chassis of the electronic apparatus can be made thinner and smaller.

DETAILED DESCRIPTION OF THE INVENTION

Figure 1:
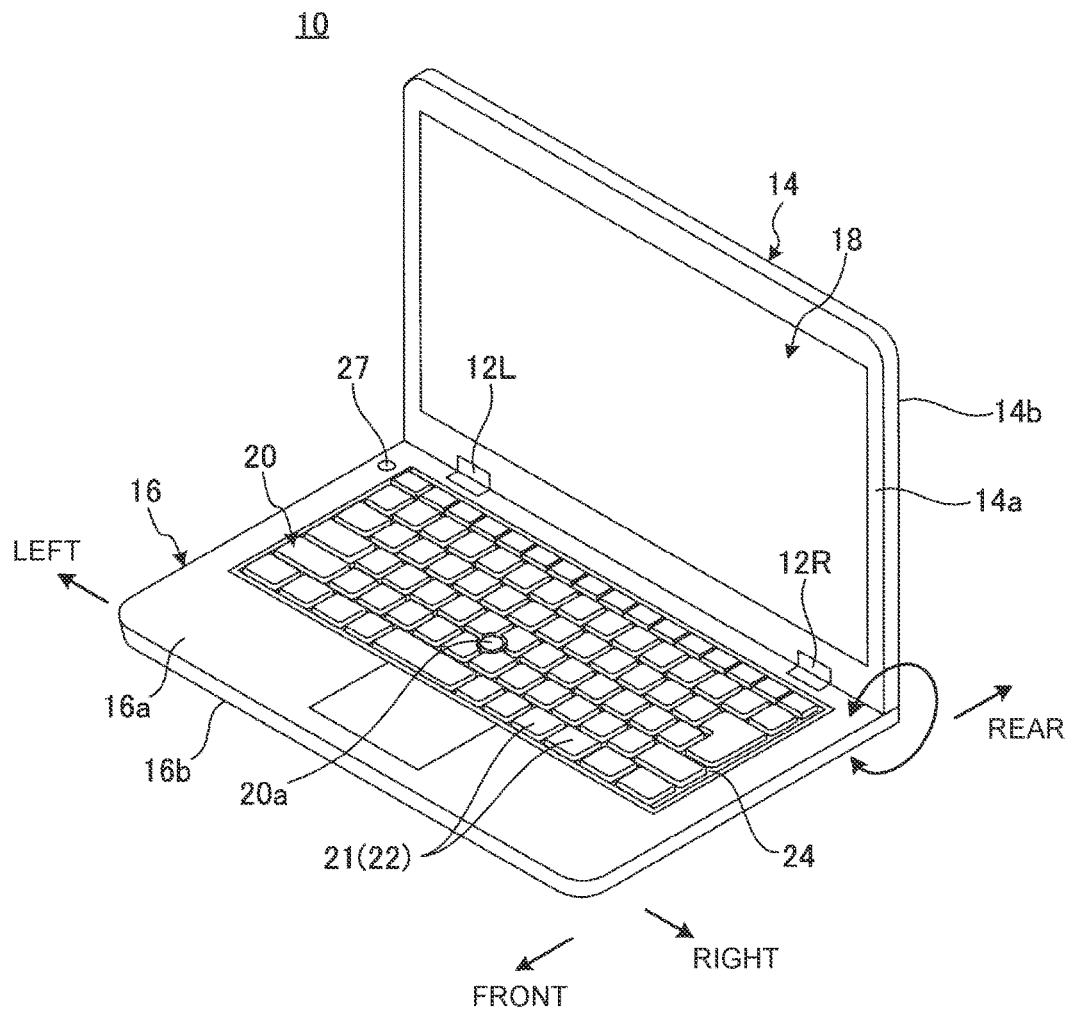
FIG. 1 is a perspective view of an electronic apparatus.
Figure 2:
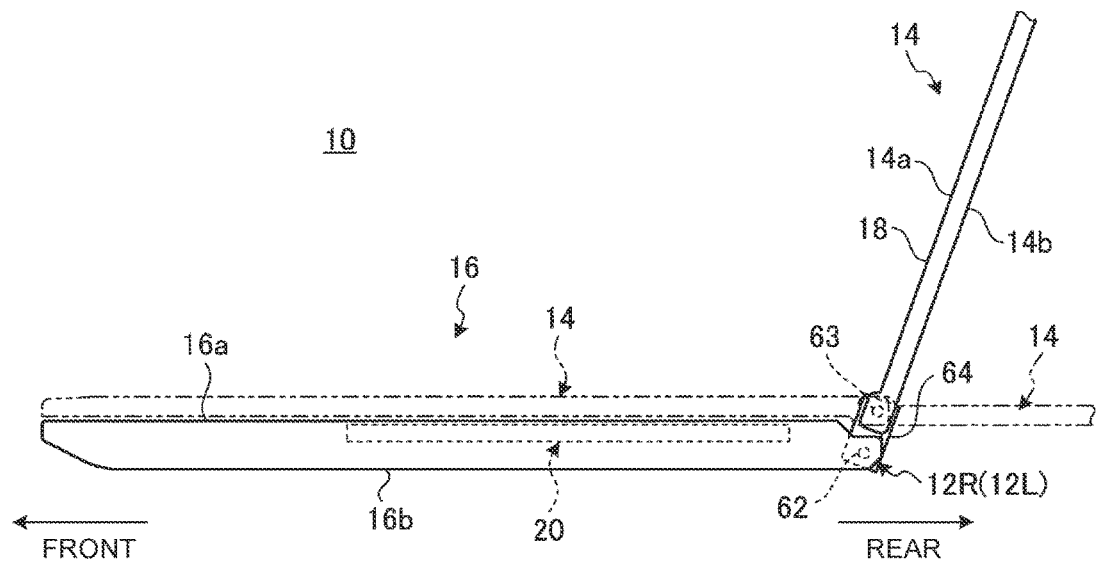
FIG. 2 is a side view of the electronic apparatus illustrated in FIG. 1.
Figure 3:
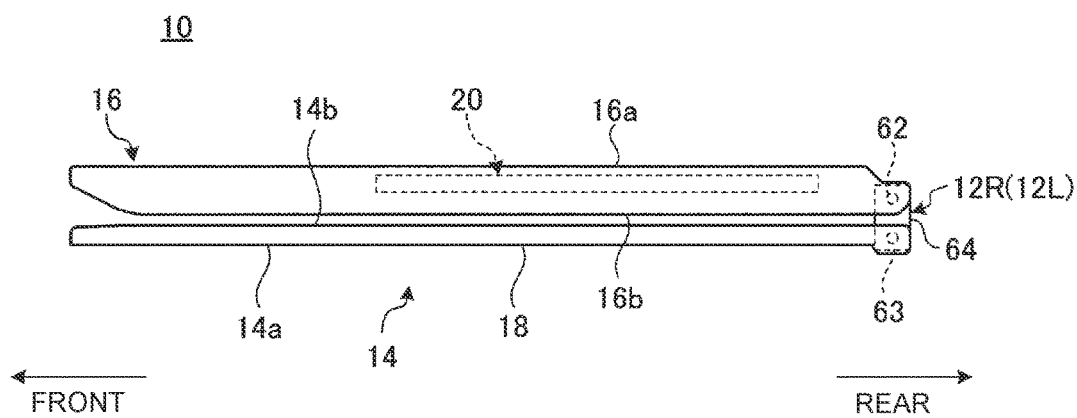
FIG. 3 is a side view of the electronic apparatus used in a tablet PC mode, in which a display chassis has been pivoted in an opening direction from the state illustrated in FIG. 2 to a 360-degree position.

FIG. 1 is a perspective view of an electronic apparatus 10 according to the present disclosure. FIG. 1 illustrates the electronic apparatus 10 used in a laptop PC mode, in which a display chassis 14 has been opened from a main unit chassis 16 by hinge mechanisms 12L, 12R. FIG. 2 is a side view of the electronic apparatus 10 illustrated in FIG. 1. FIG. 3 is a side view of the electronic apparatus 10 used in a tablet PC mode, in which the display chassis 14 has pivoted from the state illustrated in FIG. 2 in the opening direction to a 360-degree position.

The electronic apparatus 10 according to the present disclosure is a convertible PC that can be used as a laptop PC and a tablet PC. The electronic apparatus 10 can be ideally used as a laptop PC in a state in which the display chassis 14 has pivoted to an angular position of about 90 degrees to about 150 degrees with respect to the main unit chassis 16 (refer to FIG. 1 and FIG. 2). The electronic apparatus 10 can be ideally used as a tablet PC in a state in which the display chassis 14 has pivoted to a 360-degree position with respect to the main unit chassis 16 (refer to FIG. 3). The contents of the present disclosure can be applied to a variety of types of electronic apparatuses, such as a cellular phone, a smartphone, and an electronic organizer.

In the following description, the laptop PC in FIG. 1 and FIG. 2 illustrates the standard use mode of the electronic apparatus. When an operator, who operates a keyboard assembly 20, looks at a display 18, the near side is defined as the front side, the far side is defined as the rear side, the direction of the thickness of the main unit chassis 16 is defined as the vertical direction, and the direction of the width of the main unit chassis 16 is defined as the lateral direction.

If the display chassis 14 has been completely closed with respect to the main unit chassis 16, with the surfaces (an inner surface 14a and an upper surface 16a), i.e. the display 18 and the keyboard assembly 20, opposing each other, then the angular position of the display chassis 14 with respect to the main unit chassis 16 is referred to as a zero-degree position (refer to the display chassis 14 indicated by one two-dash chain line in FIG. 2). The display chassis 14 pivots in the opening direction from the zero-degree position, which is defined as the reference angular position. Each angular position will be described below. An attitude in which, for example, the display chassis 14 and the main unit chassis 16 are orthogonal to each other is referred to as a 90-degree position. An attitude in which the inner surface 14a and the upper surface 16a are oriented in the same direction (upward) and parallel to each other is referred to as a 180-degree position (refer to the display chassis 14 indicated by the other two-dash chain line in FIG. 2). An attitude in which the rear surfaces of the display chassis 14 and the main unit chassis 16, i.e. an outer surface 14b of the display chassis 14 and a lower surface 16b of the main unit chassis 16, oppose each other is referred to as a 360-degree position (refer to FIG. 3). The zero-degree position, the 180-degree position, the 360-degree position and the like may naturally be angular positions that are slightly different from accurate angular positions indicated by angular numbers, depending on the structures of the main unit chassis 16, the display chassis 14, or the hinge mechanisms 12L, 12R.

Referring to FIG. 1 to FIG. 3, the electronic apparatus 10 includes the display chassis (a second chassis) 14 having the display 18, and the main unit chassis (a first chassis) 16 having the keyboard assembly 20. The display chassis 14 and the main unit chassis 16 are connected by a pair of left and right hinge mechanisms 12L, 12R (hereinafter may generically be referred to as a "hinge mechanism 12") such that the display chassis 14 and the main unit chassis 16 are pivotable from the zero-degree position to the 360-degree position.

The display chassis 14 is electrically connected to the main unit chassis 16 through a cable (not illustrated) passing through the hinge mechanism 12. The display 18 is composed of, for example, a touch panel type liquid crystal display assembly.

The main unit chassis 16 is shaped like a flat box and has the hinge mechanism 12 at its rear edge. The main unit chassis 16 accommodates therein various electronic components, such as a substrate, an arithmetic device, and a memory. The keyboard assembly 20 is provided on the upper surface 16a of the main unit chassis 16.

The keyboard assembly 20 has a plurality of key switches 21 arranged in the longitudinal and lateral directions, and a frame 24 that fills in the gaps around keytops (movable members) 22 constituting the operation surfaces of the key switches 21. According to the present disclosure, the keyboard assembly 20 has an isolation structure, in which adjacent keytops 22 are independent from each other by being defined by the frame 24.

The frame 24 is a frame-shaped plate having a plurality of holes 24a (refer to FIG. 5A and FIG. 5B), in which the keytops 22 of the key switches 21 are inserted. The frame 24 is installed to be substantially flush with or slightly lower than the upper surface 16a of the main unit chassis 16.

The keyboard assembly 20 has a key depressing mechanism 26, which holds the keytops 22 depressed at a depressed position, which is lower than a normal use position, at the zero-degree position and the 360-degree position. This arrangement achieves the thinner design of the electronic apparatus 10, in which the keytops 22 are prevented from projecting from the upper surface 16a of the main unit chassis 16 at the zero-degree position and the 360-degree position.

A pointing stick 20a is provided near the center of the keyboard assembly 20. The pointing stick 20a is an input unit that can be operated in place of a mouse and is capable of operating a cursor (mouse pointer) shown on the display 18. A power switch 27 is provided beside the keyboard assembly 20.

A specific configuration example of the keyboard assembly 20 will now be described.

Figure 4:
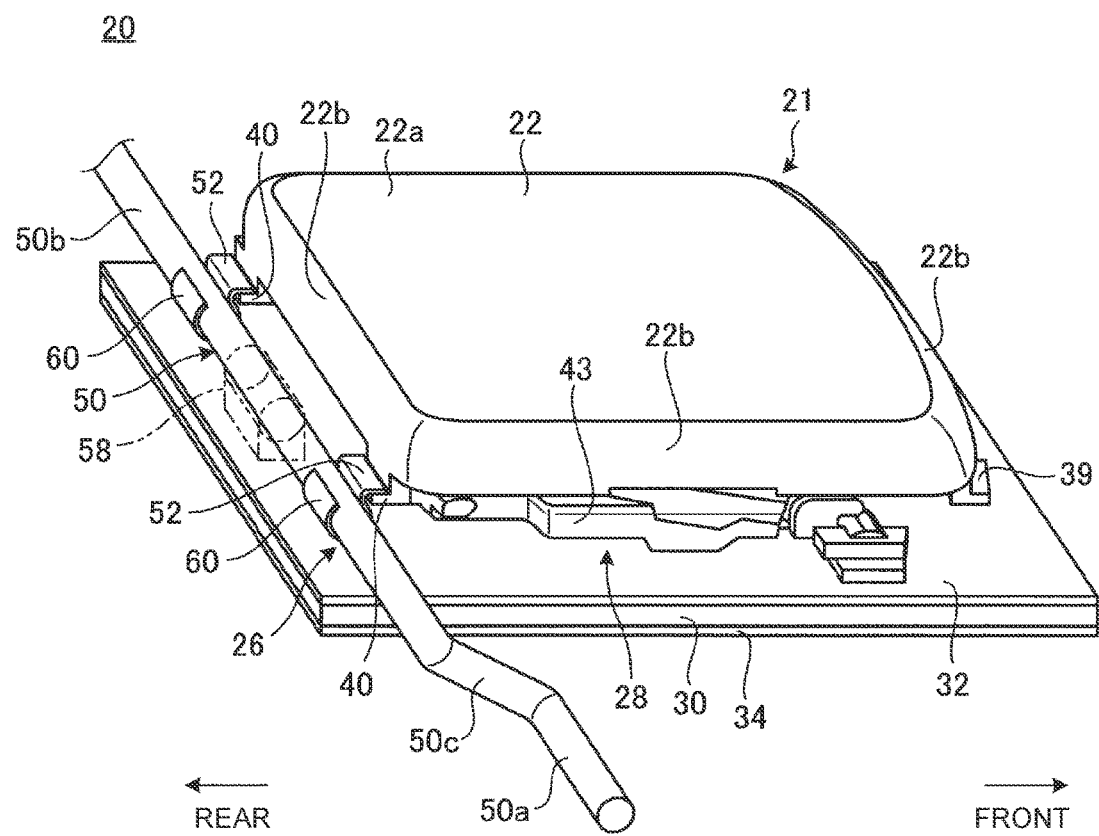
FIG. 4 is a perspective, enlarged view of a key switch and a neighboring area of the key switch in a keyboard assembly.
Figure 5A:
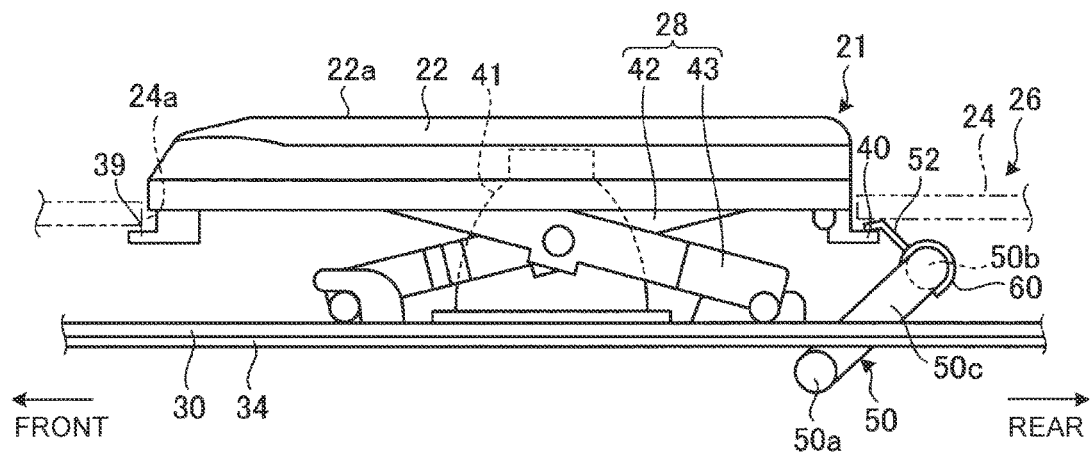
FIG. 5A is a side view of a keytop in an uppermost use position.
Figure 5B:
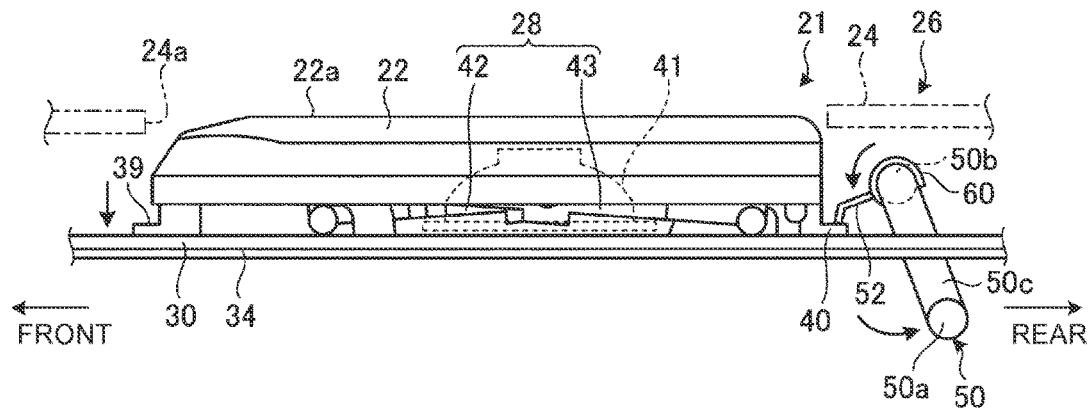
FIG. 5B is a side view of the keytop depressed by a key depressing mechanism from the state illustrated in FIG. 5A to a depressed position, which is a lowermost position.

FIG. 4 is a perspective enlarged view of the key switch 21 and its peripheral section of the keyboard assembly 20. FIG. 5A is a side view of the keytop 22 in its uppermost use position. FIG. 5B is a side view of the keytop 22 in a state in which the keytop 22 has been depressed by the key depressing mechanism 26 from its position illustrated in FIG. 5A to its lowermost depressed position.

As illustrated in FIG. 4, FIG. 5A and FIG. 5B, the keyboard assembly 20 has the key switches 21, which vertically movably support the keytops 22 by guide mechanisms 28, and a base plate 30, which supports the key switches 21 on the upper surface side. A membrane sheet 32 is placed on the upper surface of the base plate 30, and a waterproof sheet 34 is attached to the lower surface of the base plate 30. The membrane sheet 32 is not illustrated in FIG. 5A and FIG. 5B.

The base plate 30 formed by cutting and raising or punching a metal sheet, such as a thin aluminum sheet, serves as a mounting plate of the key switches 21. All the key switches 21 share the single base plate 30. The frame 24 is placed on the upper surface of the base plate 30.

The membrane sheet 32 is deposited on the base plate 30. The membrane sheet 32 is formed of two layers, e.g. a top layer and a bottom layer. On the membrane sheet 32, a comb teeth switch pattern is formed, and rubber domes 41 with electric conductors are brought in contact with the switch pattern, thereby forming a switch circuit. The membrane sheet 32 may be a three-layer switch sheet, in which a contact is closed when pressed. The membrane sheet 32 has through holes, and the guide mechanisms 28 land on the upper surface of the base plate 30 through the through holes. The membrane sheet 32 may alternatively be placed under the base plate 30.

The keytops 22 are provided above the base plate 30 through the intermediary of the guide mechanisms 28. The keytops 22 are operation members for entering signals. The keytops 22 are formed of resin or the like and have an approximately square shape in a top view. Each of the keytops 22 has an upper surface 22a, which is an operation surface, and side surfaces 22b, which extend downward from the edges of the four sides of the upper surface 22a. The side surface 22b on the front side has a pair of left and right protruding pieces 39 formed to protrude forward. The side surface 22b on the rear side has a pair of left and right receiving pieces 40 formed to protrude backward. The guide mechanism 28 and the rubber dome 41 are installed in the space inside the keytop 22 enclosed by the upper surface 22a and the side surfaces 22b (refer to FIG. 5A).

The protruding pieces 39 are wing-shaped members having approximately square shapes, protruding outward from the side surfaces 22b, in a top view. The protruding pieces 39 function as the members which come in contact with the top surface of the frame 24 thereby to prevent the keytops 22 from slipping off upward. The protruding pieces 39 also function to restrict the maximum height positions of the keytops 22 when the keytops 22 move upward.

The receiving pieces 40 are wing-shaped members having approximately square shapes, protruding outward from the side surfaces 22b, in a top view. The receiving pieces 40 are the members which receive the force applied by the key depressing mechanism 26 to press the keytops 22 downward. The receiving pieces 40 also function to prevent, together with the protruding pieces 39, the keytops 22 from slipping off upward and to restrict the maximum height positions of the keytops 22 when the keytops 22 move upward.

The rubber dome 41 is an elastic member adapted to press the membrane sheet 32 when the keytop 22 is depressed and to reset the keytop 22 to its original position when the depressing operation of the keytop 22 is cleared. The rubber dome 41 is disposed between the membrane sheet 32 and the keytop 22. The keytop 22 is elastically supported by the rubber dome 41 in a state in which the keytop 22 is guided by the guide mechanism 28 in a vertically movable manner. The rubber dome 41 is formed of an elastic material having flexibility, such as a silicone rubber.

In each of the key switches 21, when the keytop 22 is operated to be depressed, the operating force causes the rubber dome 41 to elastically deform and the membrane sheet 32 to be pressed, and the membrane sheet 32 closes a contact. When the operation of depressing the keytop 22 is cleared, the keytop 22 is returned to the original position (the use position) by the elastic restoring force of the rubber dome 41 and the membrane sheet 32 opens the contact.

Each of the guide mechanisms 28 is adapted to support the keytop 22 in the vertically movable manner, and is foldably installed between the base plate 30 and the keytop 22. The guide mechanism 28 in the present disclosure has a pantograph structure that includes an inner frame 42 and an outer frame 43, which are installed in a diagonal brace manner.

A description will now be given of a configuration example of the key depressing mechanism 26, which holds the keytop 22 of each of the key switches 21 in the depressed position.

Figure 6:
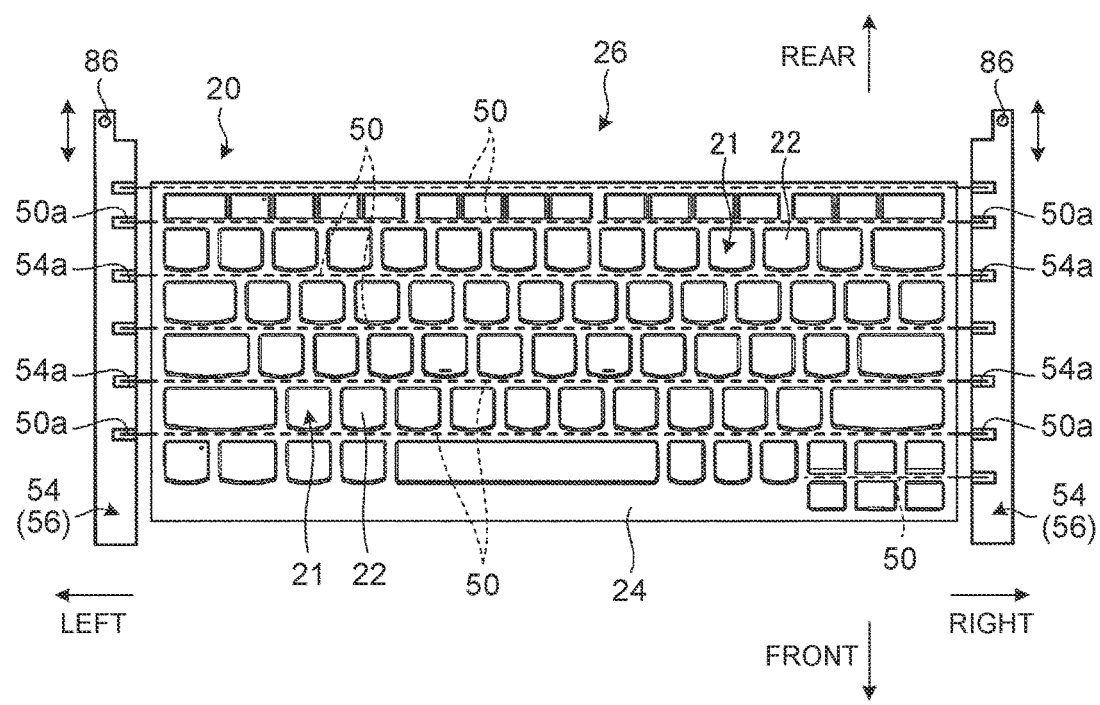
FIG. 6 is a plan view schematically illustrating the configuration of the key depressing mechanism.

FIG. 6 is a plan view schematically illustrating the configuration of the key depressing mechanism 26. The key depressing mechanism 26 has rotating shaft members (drive members) 50 and pressing pieces 52.

As illustrated in FIG. 4 to FIG. 6, a plurality of the rotating shaft members 50 are provided in the longitudinal direction of the keyboard assembly 20, extending along the rear portions of the keytops 22 arranged in the lateral direction of the keyboard assembly 20. Each of the rotating shaft members 50 is, for example, a hard wire rod (wire) made of a SUS material or the like, and exhibits sufficient rigidity even if the diameter thereof is, for example, approximately 1 mm.

On the lower surface side of the frame 24 of the keyboard assembly 20, the rotating shaft members 50 extend in the lateral direction of the keyboard assembly 20. Provided on the left and right ends of the rotating shaft members 50 are drive end sections 50a protruding from both left and right sides of the frame 24. The drive end sections 50a are rotatably engaged with slits 54a of Z sliders (second sliding members) 54 provided on the left and right sides of the keyboard assembly 20. The Z sliders 54 constitute link mechanisms 56, which will be discussed hereinafter, and are slidable in the longitudinal direction on the left and right of the keyboard assembly 20.

As illustrated in FIG. 4, FIG. 5A and FIG. 5B, each of the rotating shaft members 50 has a linear base section 50b extending in the lateral direction along the rear portions of the keytops 22, and the drive end sections 50a provided on both ends of the base section 50b. Each of the drive end sections 50a is formed by bending, by 90 degrees, the distal end of an arm section 50c formed by bending an end portion of the base section 50b by 90 degrees, so that the drive end section 50a projects in the lateral direction to be parallel to the base section 50b. Thus, both ends of the rotating shaft member 50 are crank-shaped.

Each of the base sections 50b is rotatably positioned and supported, at an appropriate place in the lateral direction thereof, by a bearing 58 (refer to FIG. 4) provided on the base plate 30 or the frame 24. With this arrangement, as the left and right Z sliders 54 move in the longitudinal direction, the drive end sections 50a move in the longitudinal direction together with the Z sliders 54 while rotating in the slits 54a of the Z sliders 54. This causes the base sections 50b to rotate about their axes while the arm sections 50c swing about the base sections 50b, which are journaled by the bearings 58, in the longitudinal direction in a pendulum manner (refer to FIG. 5A and FIG. 5B).

Each of the pressing pieces 52 is formed by bending a mounting cylindrical member 60 fixed by external fitting to the outer peripheral surface of the base section 50b of the rotating shaft member 50. Thus, the pressing piece 52 projects toward the keytop 22 from the outer peripheral surface of the base section 50b. The mounting cylindrical member 60 is firmly fixed to the base section 50b by swaging or spot welding. The pressing pieces 52 are plate pieces projecting from the outer peripheral surfaces of the mounting cylindrical members 60. The pressing pieces 52 are disposed in contact with the upper surfaces of the receiving pieces 40 of the keytop 22 and are capable of pressing the receiving pieces 40 downward.

In the key depressing mechanism 26, with the keytops 22 in the use position illustrated in FIG. 5A, if the left and right Z sliders 54 move backward and the drive end sections 50a move backward accordingly, then the base sections 50b rotate about the axes thereof. This causes the pressing pieces 52, which project from the outer peripheral surfaces of the base sections 50b, to swing downward to depress the receiving pieces 40 of the keytops 22, thereby forcibly depressing the keytops 22. As a result, the keytop 22 are held in the depressed position illustrated in FIG. 5B. At the depressed position, the upper surfaces 22a of the keytops 22 are positioned flush with or slightly lower than the upper surface of the frame 24, thus making the upper surface of the keyboard assembly 20 flat and level.

Meanwhile, with the keytops 22 in the depressed position illustrated in FIG. 5B, if the left and right Z sliders 54 move forward, which is opposite from that in the depressing operation, then the base sections 50b also rotate in the opposite direction from that in the depressing operation. This causes the pressing pieces 52 to swing upward, thereby clearing the pressing on the receiving pieces 40. As a result, the keytops 22 are moved upward by the urging force of the rubber domes 41 and returned to the use position illustrated in FIG. 5A.

The operation of depressing the keytops 22 by the key depressing mechanism 26 is performed in conjunction with the hinge mechanism 12 through the link mechanism 56 and is based on the pivot angle position of the display chassis 14.

A description will now be given of the configuration examples of the hinge mechanism 12 and the link mechanisms 56, which interlock the pivoting operation of the display chassis 14 and the key depressing mechanism 26.

First, the configuration example of the hinge mechanism 12 will be described.

Figure 7:
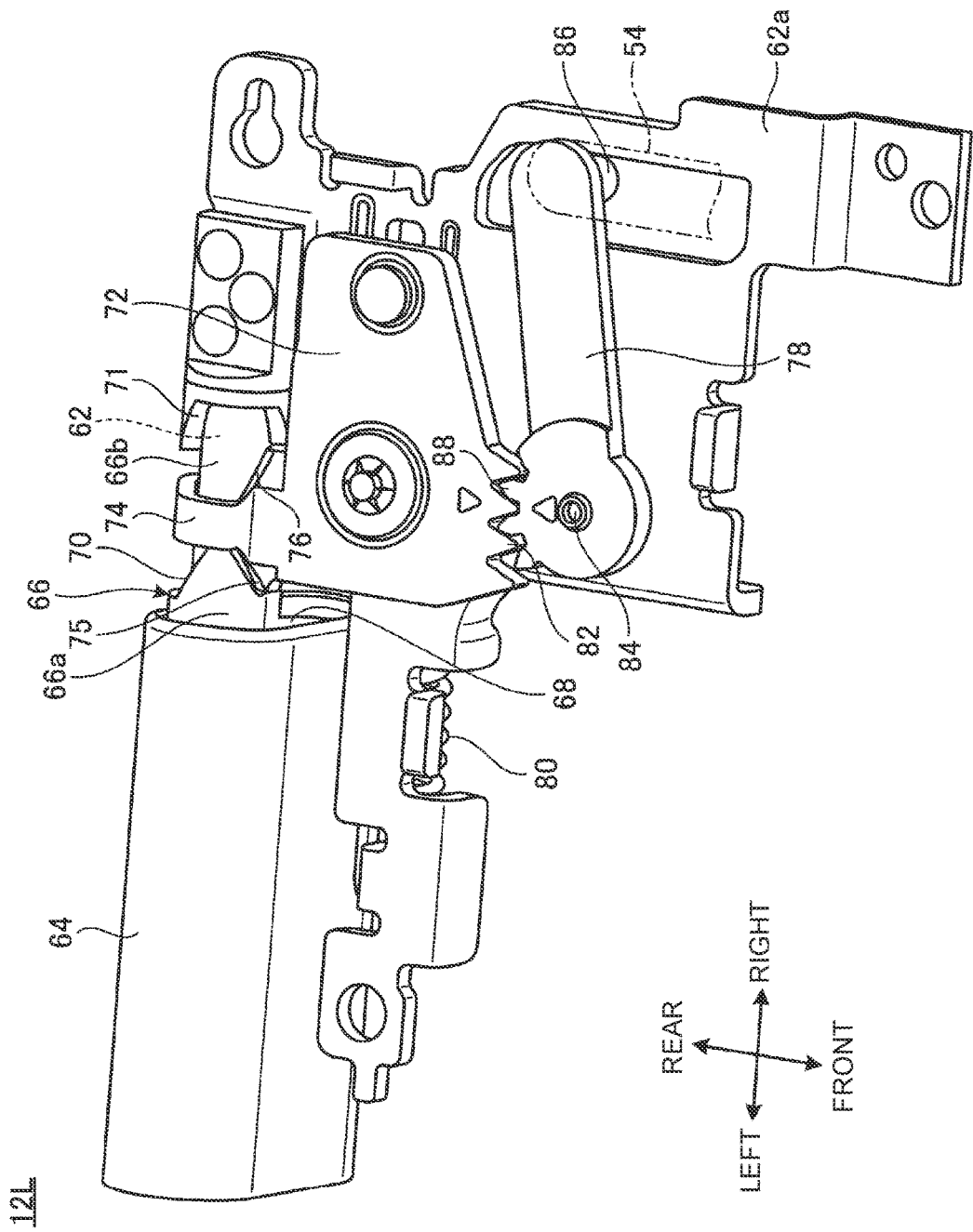
FIG. 7 is a perspective view illustrating a configuration example of a hinge mechanism.
Figure 8A:
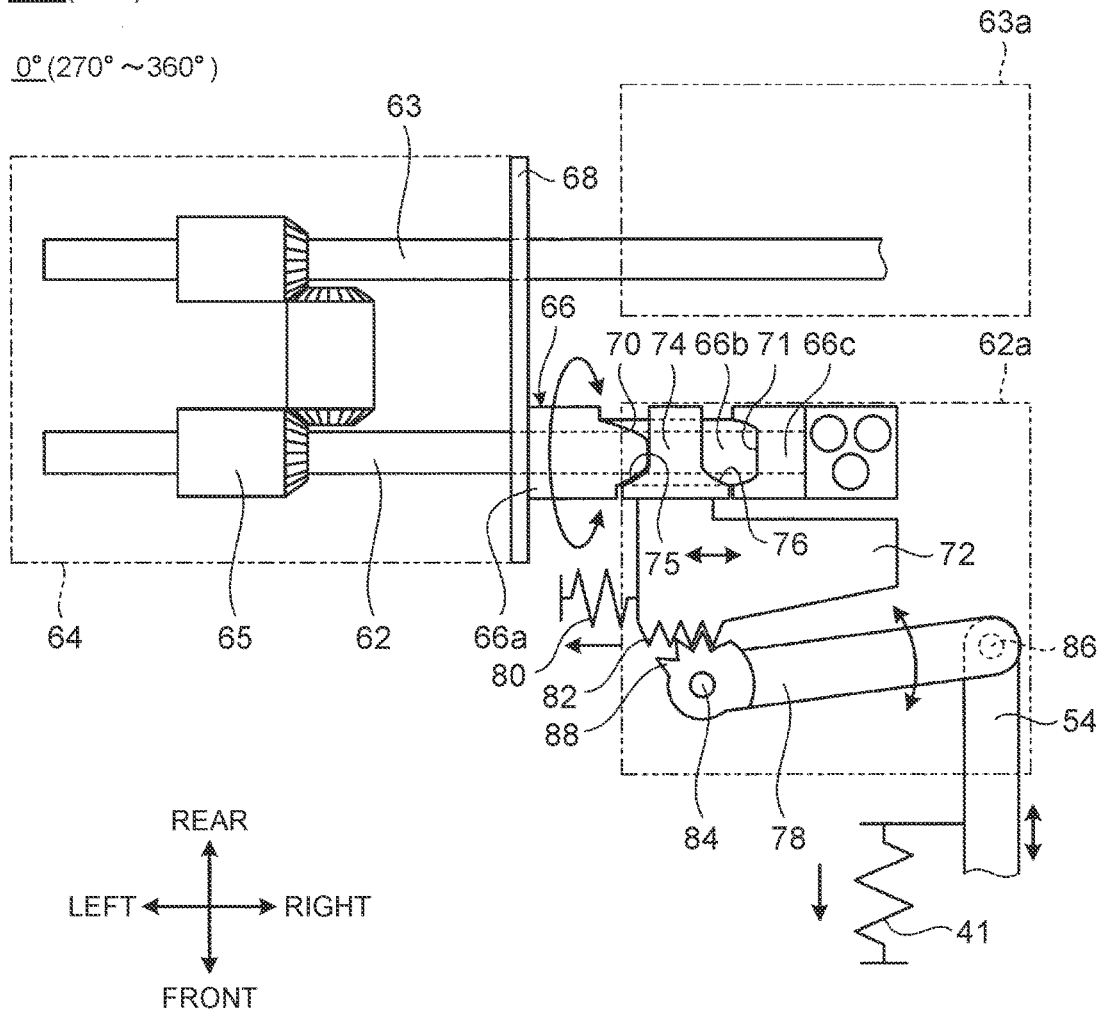
FIG. 8A is a plan view schematically illustrating the configuration example of the hinge mechanism at a zero-degree position (a 270-degree position to the 360-degree position)
Figure 8B:
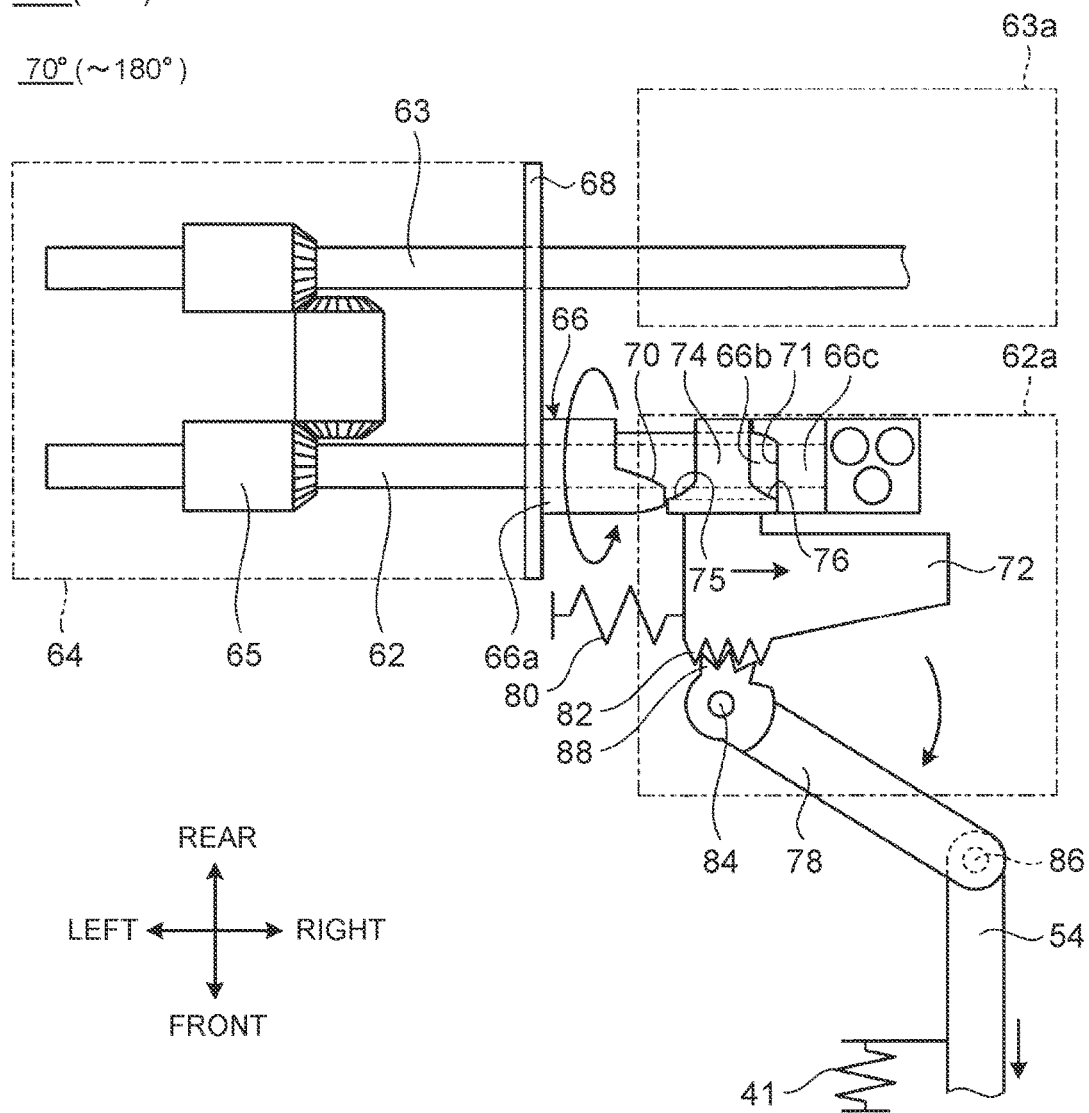
FIG. 8B is a plan view schematically illustrating a configuration example of the hinge mechanism at a 70-degree position to a 180-degree position.

FIG. 7 is a perspective view schematically illustrating the configuration example of the hinge mechanism 12. FIG. 8A is a plan view schematically illustrating the configuration example of the hinge mechanism 12 at the zero-degree position (the 270-degree position to the 360-degree position). FIG. 8B is a plan view schematically illustrating the configuration example of the hinge mechanism 12 at the 70-degree position to the 180-degree position. FIG. 7, FIG. 8A, and FIG. 8B representatively illustrate the configuration of the left hinge mechanism 12L. In the following description, the left hinge mechanism 12L will be representatively described as the hinge mechanism 12. The right hinge mechanism 12R shares the same structure as the left hinge mechanism 12L except for being laterally symmetrical, and hence, a detailed description thereof will be omitted. Further, in FIG. 8A and FIG. 8B, the pivoting operation of a hinge chassis 64 is not illustrated in order to secure the visibility of the drawings.

Referring to FIG. 7 to FIG. 8B, the hinge mechanism 12 has a first shaft 62 extending in the lateral direction, a second shaft 63 installed in parallel to the first shaft 62, and a box-shaped hinge chassis 64, which rotatably supports and houses the first shaft 62 and the second shaft 63 (refer also to FIG. 2 and FIG. 3).

A mounting plate 62a fixed to one end of the first shaft 62 is fixed to the main unit chassis 16, so that the first shaft 62 rotates integrally with the main unit chassis 16. A mounting plate 63a fixed to one end of the second shaft 63 is fixed to the display chassis 14, so that the second shaft 63 rotates integrally with the display chassis 14. The other ends of the first shaft 62 and the second shaft 63 are rotatably supported in the hinge chassis 64. In the case of the present disclosure, the first shaft 62 and the second shaft 63 are configured to synchronously rotate through the intermediary of a gear train 65.

The first shaft 62 has a cylindrical cam member 66 coaxially disposed on the outer peripheral surface of an outer portion of the hinge chassis 64. The cylindrical cam member 66 is externally inserted to the outer peripheral surface of the first shaft 62 such that the cylindrical cam member 66 is rotatable with respect to the first shaft 62. The cylindrical cam member 66 is provided integrally with a support plate 68 fixed to one side of the hinge chassis 64. The support plate 68 is a plate-like member, which is provided integrally with the hinge chassis 64 and which has shaft holes in which the first shaft 62 and the second shaft 63 are rotatably inserted. When the first shaft 62 and the hinge chassis 64 relatively rotate, the cylindrical cam member 66 relatively rotates together with the hinge chassis 64 as one piece with respect to the first shaft 62.

The cylindrical cam member 66 has a first cylindrical section 66a, an intermediate cylindrical section 66b, and a second cylindrical section 66c arranged in this order in the axial direction of the first shaft 62. One end surface of the first cylindrical section 66a is provided with a first cam surface 70. The other end surface of the second cylindrical section 66c is provided with a second cam surface 71. The first cam surface 70 and the second cam surface 71 oppose each other. The first cylindrical section 66a, the intermediate cylindrical section 66b, and the second cylindrical section 66c are externally inserted onto the outer peripheral surface of the first shaft 62 in a rotatable manner and also immovable in the axial direction. The first cylindrical section 66a and the second cylindrical section 66c have outer peripheral surfaces of diameters that are larger than the diameter of the intermediate cylindrical section 66b. The first cylindrical section 66a and the second cylindrical section 66c have the first cam surface 70 and the second cam surface 71, respectively, at the stepped portions of the outside diameter section between the first cylindrical section 66a and the intermediate cylindrical section 66b and between the intermediate cylindrical section 66b and the second cylindrical section 66c. The first cam surface 70 and the second cam surface 71 are shaped such that their positions in the axial direction change along the circumferential direction.

A cylindrical connecting section 74 of an X slider (sliding member) 72 is coaxially disposed on the outer peripheral surface of the intermediate cylindrical section 66b. The X slider 72 is pressed by the cylindrical cam member 66, which rotates on the outer peripheral surface of the first shaft 62, and moved in the lateral direction. The X slider 72 is supported slidably in the lateral direction in the main unit chassis 16.

The cylindrical connecting section 74 is externally inserted to be rotatable with respect to the intermediate cylindrical section 66b between the first cam surface 70 and the second cam surface 71. The cylindrical connecting section 74 is externally inserted such that the cylindrical connecting section 74 is unrotatable with respect to the first shaft 62 and movable in the axial direction. The cylindrical connecting section 74 is provided with a first pressure receiving surface 75 on an end surface which opposes the first cam surface 70 and a second pressure receiving surface 76 on the other end surface which opposes the second cam surface 71. The first pressure receiving surface 75 is a surface, the position of which in the axial direction changes along the circumferential direction and which can be in sliding contact with the first cam surface 70 rotating on the outer peripheral surface of the first shaft 62. The second pressure receiving surface 76 is a surface, the position of which in the axial direction changes along the circumferential direction and which can be in sliding contact with the second cam surface 71 rotating on the outer peripheral surface of the first shaft 62. The cylindrical connecting section 74 moves in the lateral direction on the outer peripheral surface of the intermediate cylindrical section 66b by the first pressure receiving surface 75 or the second pressure receiving surface 76 being pressed by the first cam surface 70 or the second cam surface 71. This causes the X slider 72 to move in the lateral direction.

Figure 9A:
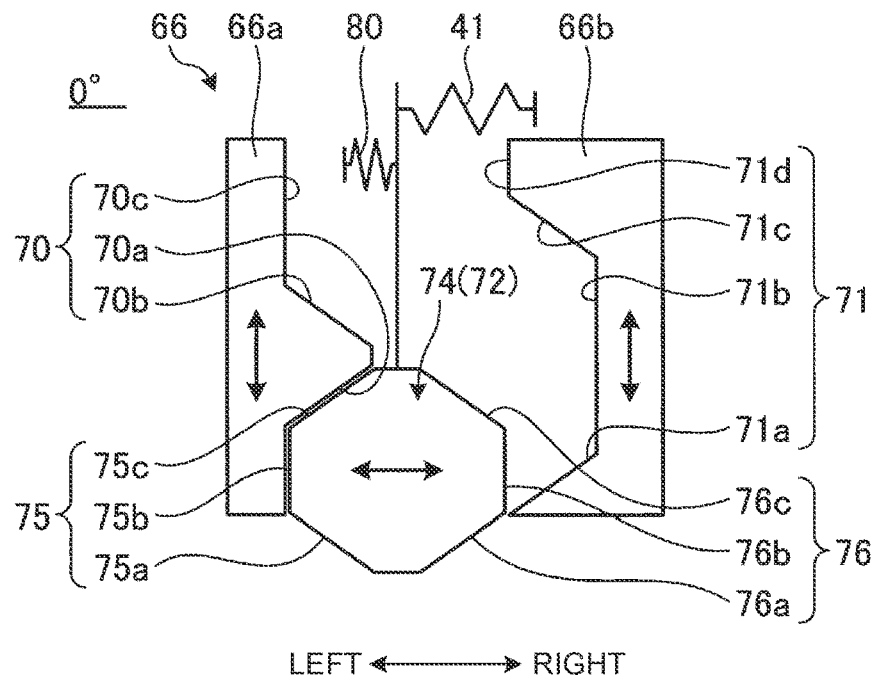
FIG. 9A is a development view schematically illustrating a cylindrical cam member and a cylindrical connecting section of an X slider, which have been developed in a circumferential direction at the zero-degree position.
Figure 9B:
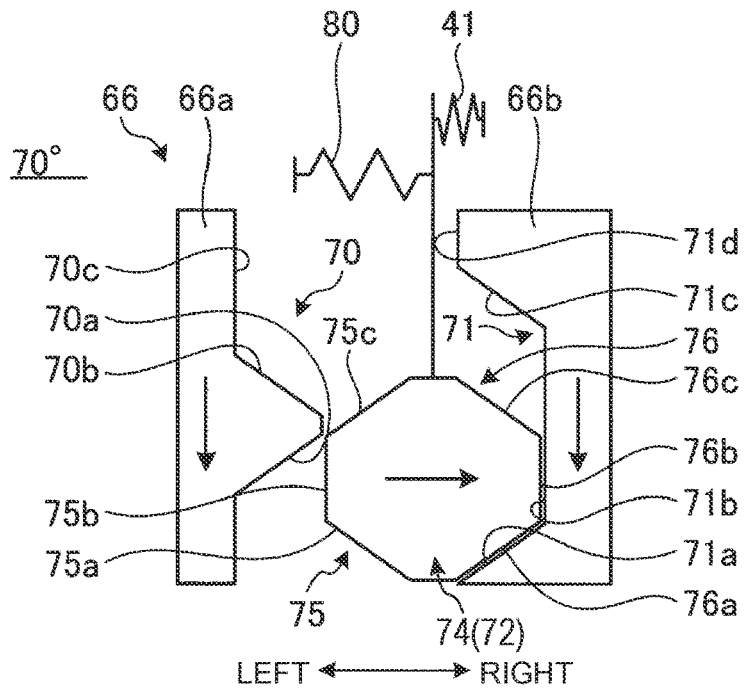
FIG. 9B is a development view schematically illustrating the cylindrical cam member and the cylindrical connecting section of the X slider, which have been developed in the circumferential direction at the 70-degree position.
Figure 9C:
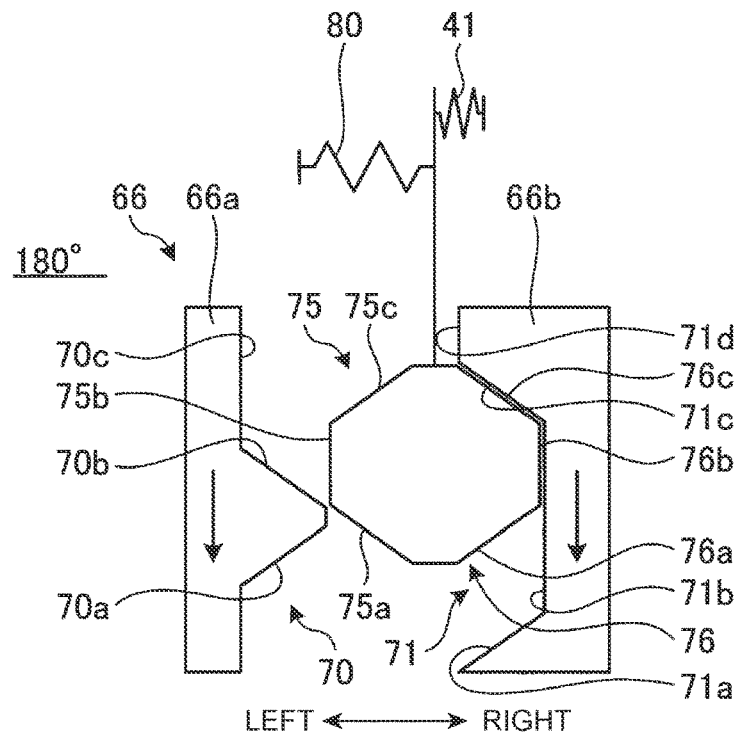
FIG. 9C is a development view schematically illustrating the cylindrical cam member and the cylindrical connecting section of the X slider, which have been developed in the circumferential direction at the 180-degree position.
Figure 9D:
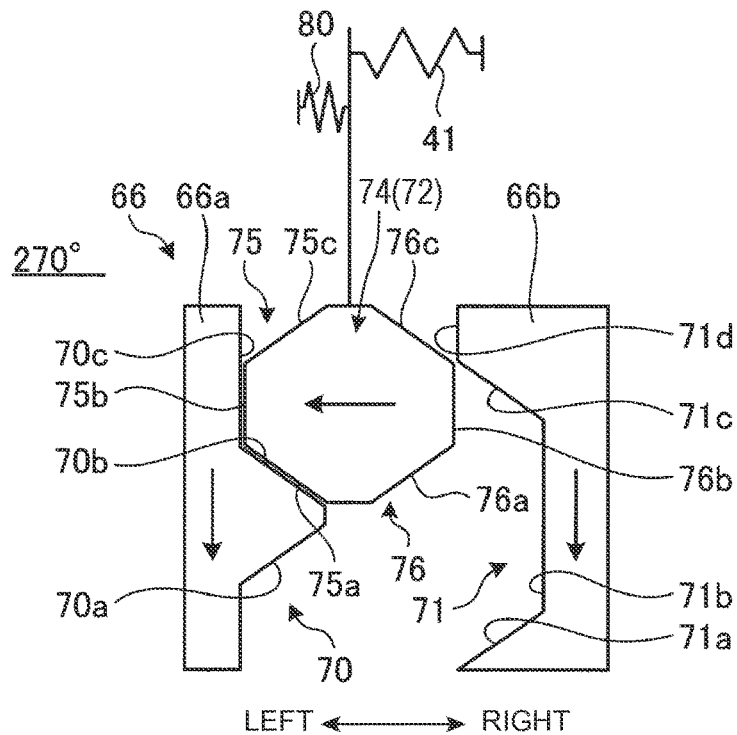
FIG. 9D is a development view schematically illustrating the cylindrical cam member and the cylindrical connecting section of the X slider, which have been developed in the circumferential direction at the 270-degree position.

FIG. 9A to FIG. 9D are development views schematically illustrating the cylindrical cam member 66 and the cylindrical connecting section 74 of the X slider 72, which have been developed in a circumferential direction. FIG. 9A illustrates the positional relationship at the zero-degree position, FIG. 9B illustrates the positional relationship at the 70-degree position, FIG. 9C illustrates the positional relationship at the 180-degree position, and FIG. 9D illustrates the positional relationship at the 270-degree position.

As illustrated in FIG. 9A to FIG. 9D, the first cam surface 70 of the cylindrical cam member 66 has a first actuating surface 70a, a second actuating surface 70b, and an idling surface 70c in this order in the circumferential direction of the first cam surface 70. The first actuating surface 70a and the second actuating surface 70b are formed like hill-shaped convex portions that are spirally displaced in the axial direction (the lateral direction) along the circumferential direction. The first actuating surface 70a is an inclined surface extending from left to right in FIG. 9A. The second actuating surface 70b is an inclined surface extending from right to left in FIG. 9A. The idling surface 70c is a surface that extends along the circumferential direction with no change in the lateral direction.

The first cam surface 70 is disposed such that the first cam surface 70 opposes and can be in sliding contact with the first pressure receiving surface 75 of the cylindrical connecting section 74. The first pressure receiving surface 75 has a first passive surface 75a, an idling surface 75b, and a second passive surface 75c in this order along the circumferential direction of the first pressure receiving surface 75. The first passive surface 75a is an inclined surface extending from right to left in FIG. 9A. The second passive surface 75c is an inclined surface extending from left to right in FIG. 9A. The idling surface 75b is a surface extending along the circumferential direction with no displacement in the lateral direction.

The second cam surface 71 of the cylindrical cam member 66 has a first actuating surface 71a, a first idling surface 71b, a second actuating surface 71c, and a second idling surface 71d in this order in the circumferential direction of the second cam surface 71. The first actuating surface 71a, the first idling surface 71b, and the second actuating surface 71c are formed like trapezoidal concave portions that are spirally displaced in the axial direction (the lateral direction) along the circumferential direction. The first actuating surface 71a is an inclined surface extending from left to right in FIG. 9A. The second actuating surface 71c is an inclined surface extending from right to left in FIG. 9A. The first idling surface 71b and the second idling surface 71d are surfaces that extend along the circumferential direction with no change in the lateral direction.

The second cam surface 71 is disposed such that the second cam surface 71 opposes and can be in sliding contact with the second pressure receiving surface 76 of the cylindrical connecting section 74. The second pressure receiving surface 76 has a first passive surface 76a, an idling surface 76b, and a second passive surface 76c in this order along the circumferential direction of the second pressure receiving surface 76. The first passive surface 76a is an inclined surface extending from left to right in FIG. 9A. The second passive surface 76c is an inclined surface extending from right to left in FIG. 9A. The idling surface 76b is a surface extending along the circumferential direction with no displacement in the lateral direction.

In the first cam surface 70 and the first pressure receiving surface 75, the first actuating surface 70a comes in sliding contact with the second passive surface 75c in the range from the zero-degree position to the 70-degree position (refer to FIG. 9A). In the range from the 70-degree position to the 180-degree position, the apex between the first actuating surface 70a and the second actuating surface 70b comes in sliding contact with the idling surface 75b (refer to FIG. 9B and FIG. 9C). Further, in the range from the 180-degree position to the 270-degree position, the second actuating surface 70b comes in sliding contact with the first passive surface 75a (refer to FIG. 9D). In the range from the 270-degree position to the 360-degree position, the idling surface 70c comes in sliding contact with the idling surface 75b (refer to FIG. 9D).

In the second cam surface 71 and the second pressure receiving surface 76, the first actuating surface 71a comes in sliding contact with the first passive surface 76a in the range from the zero-degree position to the 70-degree position (refer to FIG. 9A). In the range from the 70-degree position to the 180-degree position, the first idling surface 71b comes in sliding contact with the idling surface 76b (refer to FIG. 9B and FIG. 9C). In the range from the 180-degree position to the 270-degree position, the second actuating surface 71c comes in sliding contact with the second passive surface 76c (refer to FIG. 9D). In the range from the 270-degree position to the 360-degree position, the second idling surface 71d comes in sliding contact with the idling surface 76b (refer to FIG. 9D).

A description will now be given of the operation performed to open the display chassis 14 from the main unit chassis 16 through the intermediary of the hinge mechanism 12.

In this case, the cylindrical cam member 66 rotating integrally with the hinge chassis 64, which pivots, relatively rotates with respect to the first shaft 62, and the first pressure receiving surface 75 and the second pressure receiving surface 76 of the X slider 72, which cannot be rotated with the first shaft 62. As a result, in the range from the zero-degree position to the 70-degree position, the first actuating surface 70a of the first cam surface 70 of the cylindrical cam member 66, which moves downward in FIG. 9A, comes in sliding contact with and also presses the second passive surface 75c of the first pressure receiving surface 75. This causes the cylindrical connecting section 74 (the X slider 72) to move to the right, as illustrated in FIG. 9B. In the range from the 70-degree position to the 180-degree position, the lateral position of the X slider 72 remains unchanged, as illustrated in FIG. 9B and FIG. 9C. In the range from the 180-degree position to the 270-degree position, the second actuating surface 71c of the second cam surface 71 of the cylindrical cam member 66, which moves downward in FIG. 9C, comes in sliding contact with and also presses the second passive surface 76c of the second pressure receiving surface 76. This causes the cylindrical connecting section 74 (the X slider 72) to move to the left, as illustrated in FIG. 9D. In the range from the 270-degree position to the 360-degree position, the lateral position of the X slider 72 remains unchanged, as illustrated in FIG. 9D.

A description will now be given of a configuration example of the link mechanism 56, which interlocks the pivoting operation of the display chassis 14 by the hinge mechanism 12 and the operation of depressing the keytops 22 by the key depressing mechanism 26.

The link mechanism 56 operates inside the main unit chassis 16. As illustrated in FIG. 7 to FIG. 8B, the link mechanism 56 has the X slider 72, a link arm 78, and the Z slider 54. In the present disclosure, the link mechanism 56 operates on the surface of a mounting plate 62a, which fixes the first shaft 62 and the main unit chassis 16 together.

The X slider 72 is a plate-like member that slides in the axial direction of the first shaft 62 (the lateral direction) on the mounting plate 62a when the cylindrical connecting section 74 described above is pressed by the cylindrical cam member 66. When the display chassis 14 pivots and the cylindrical cam member 66 rotates together with the hinge chassis 64, the X slider 72 moves in the lateral direction by the sliding contact between the cylindrical cam member 66 and the cylindrical connecting section 74. The other end of an auxiliary elastic member 80, one end of which is fixed to the main unit chassis 16 (the mounting plate 62a), is fixed to the X slider 72. The auxiliary elastic member 80 continually urges the X slider 72 to the left in FIG. 8A, i.e. in the direction in which the cylindrical connecting section 74 moves closer to the first cylindrical section 66a of the cylindrical cam member 66. The X slider 72 has a gear section 82 on a side surface thereof opposite from a side surface thereof adjacent to the cylindrical connecting section 74. The gear section 82 has a few teeth arranged in the sliding direction of the X slider 72.

The link arm 78 is pivotably supported about a pivot shaft 84 on one end thereof with respect to the main unit chassis 16 (the mounting plate 62a). The other end of the link arm 78 that is on the opposite side from the pivot shaft 84 is rotatably connected to the Z slider 54 by a connecting shaft 86. A gear section 88 is provided on a side surface of the link arm 78, the side surface being near the pivot shaft 84. The gear section 88 has a few teeth that are meshable with the gear section 82 of the X slider 72. The teeth of the gear section 88 are arranged, centering around the pivot shaft 84.

The Z slider 54 is a long rectangular plate-like member (refer also to FIG. 6) provided to be slidable in the longitudinal direction with respect to the main unit chassis 16 by a guide structure (not illustrated). The rear end of the Z slider 54 is rotatably connected with the link arm 78 by using the connecting shaft 86. As described above, the rotating shaft member 50 of the key depressing mechanism 26 engages with the Z slider 54. Therefore, the urging force from the rubber dome 41 that urges the keytop 22 upward to the use position is applied to the Z slider 54 through the intermediary of the rotating shaft member 50. Thus, the Z slider 54 is continually urged toward the front in FIG. 8A from the rubber dome 41.

Referring to FIG. 8A and FIG. 8B, in the link mechanism 56, when the display chassis 14 pivots with respect to the main unit chassis 16 and the cylindrical cam member 66 rotates, the X slider 72 slides in the lateral direction. When the X slider 72 slides, the link arm 78 pivots about the pivot shaft 84 through the intermediary of the gear sections 82 and 88. When the link arm 78 pivots about the pivot shaft 84, the Z slider 54 in turn moves in the longitudinal direction through the connecting shaft 86.

At this time, the X slider 72 receives the urging force in the direction for sliding to the left in FIG. 8A due to the urging force of the auxiliary elastic member 80. In other words, the link arm 78 receives, from the auxiliary elastic member 80, the urging force in the direction for pivoting in the counterclockwise direction in FIG. 8A, while the Z slider 54 receives the urging force in the direction for sliding to the rear in FIG. 8A. Conversely, the Z slider 54 receives the urging force in the direction for sliding to the front in FIG. 8A due to the urging force of the rubber dome 41. In other words, the link arm 78 receives, from the rubber dome 41, the urging force in the direction for pivoting in the clockwise direction in FIG. 8A, while the X slider 72 receives the urging force in the direction for sliding to the right in FIG. 8A.

A description will now be given of the relationship between the pivoting operation of the display chassis 14 and the operation of the key depressing mechanism 26, which are interlocked by the link mechanism 56.

First, when the display chassis 14 is in the zero-degree position, the X slider 72 is in a leftmost position, as illustrated in FIG. 8A and FIG. 9A. Therefore, the link arm 78 is in the position where the link arm 78 has pivoted fully counterclockwise in FIG. 8A, and the Z slider 54 is in the position where the Z slider 54 has moved to a rearmost position. At this time, the first cam surface 70 of the cylindrical cam member 66 is in a position where the first actuating surface 70a opposes and is in contact with or close to the second passive surface 75c of the first pressure receiving surface 75 of the X slider 72 (refer to FIG. 9A). Meanwhile, the second cam surface 71 of the cylindrical cam member 66 is in a position apart from the second pressure receiving surface 76 of the X slider 72, and the start point of the first actuating surface 71a opposes the start point of the first passive surface 76a of the second pressure receiving surface 76 of the X slider 72.

In this state, the drive end sections 50a of the rotating shaft member 50 are located at the rearmost position by having been moved by the Z slider 54, and the receiving pieces 40 of the keytops 22 are held in a depressed position by having been depressed by the pressing pieces 52, as illustrated in FIG. 5B. Hence, the upper surfaces 22a of the keytops 22 are in the positions flush with or slightly lower than the upper surface of the frame 24. The upper surface of the keyboard assembly 20 is configured on a plane. Therefore, the thickness of the electronic apparatus 10 is controlled to a minimum possible thickness without causing the display chassis 14, when closed with respect to the main unit chassis 16, to interfere with the keytops 22.

Then, as the display chassis 14 pivots in the opening direction from the zero-degree position, the hinge chassis 64 of the hinge mechanism 12 also pivots, and the cylindrical cam member 66 rotates on the outer peripheral surface of the first shaft 62. In the range from the zero-degree position to the 70-degree position, the first actuating surface 70a of the first cam surface 70 comes in sliding contact with and presses the second passive surface 75c of the first pressure receiving surface 75. This causes the X slider 72 to move to the right against the urging force of the auxiliary elastic member 80, as illustrated in FIG. 8B and FIG. 9B. This in turn causes the link arm 78 to pivot clockwise and the Z slider 54 to move to the front (refer to FIG. 8B). At this time, the Z slider 54 receives the urging force from the rubber dome 41 and smoothly moves to the front. In the second cam surface 71, the first actuating surface 71a comes in sliding contact with the first passive surface 76a of the second pressure receiving surface 76.

When the Z slider 54 moves to the front, the drive end sections 50a of the rotating shaft member 50 also move to the front, so that the rotating shaft member 50 rotates in a direction for the pressing pieces 52 to move upward (refer to FIG. 5A). This clears the pressing on the receiving pieces 40 by the pressing pieces 52, thus causing the keytop 22 to move upward together with the pressing pieces 52 by the urging force of the rubber dome 41.

At the 70-degree position, the X slider 72 is in a rightmost position, as illustrated in FIG. 8B and FIG. 9B. Hence, the link arm 78 reaches a fully pivoted clockwise position, and the Z slider 54 reaches a frontmost position.

In this state, the drive end sections 50a of the rotating shaft member 50 are located in the frontmost position by having been moved by the Z slider 54 and the keytops 22 are in the use position, which is the uppermost position thereof, as illustrated in FIG. 5A. The pressing pieces 52 at the uppermost position restrict the maximum height positions of the receiving pieces 40. As described above, in the electronic apparatus 10, when the display chassis 14 pivots open to the 70-degree position, the keytops 22 will project upward from the upper surface of the frame 24 to reach the use position, thus making the keyboard assembly 20 ready for use.

In the range from the 70-degree position to the 180-degree position, the apex portion between the first actuating surface 70a and the second actuating surface 70b of the first cam surface 70 of the cylindrical cam member 66 comes in sliding contact with the idling surface 75b of the first pressure receiving surface 75 of the X slider 72, as illustrated in FIG. 9C. Further, the first idling surface 71b of the second cam surface 71 comes in sliding contact with the idling surface 76b of the second pressure receiving surface 76. Hence, even when the hinge chassis 64 pivots and the cylindrical cam member 66 rotates, the X slider 72 will not move in the lateral direction. Therefore, the position of the Z slider 54 remains unchanged (refer to FIG. 8B), so that the keytop 22 is maintained at the use position, as illustrated in FIG. 5A. This means that, in the electronic apparatus 10, the keyboard assembly 20 is maintained in an available state in the range from the 70-degree position to the 180-degree position, in which the electronic apparatus 10 is expected to be used as the laptop PC.

In the range from the 180-degree position to the 270-degree position, the second actuating surface 71c of the second cam surface 71 of the cylindrical cam member 66 comes in contact with and presses the second passive surface 76c of the second pressure receiving surface 76 of the X slider 72, as illustrated in FIG. 9D. As a result, the X slider 72 moves to the left against the urging force from the rubber dome 41. At this time, the X slider 72 smoothly moves to the left, being subjected to the urging force of the auxiliary elastic member 80. Thus, the link arm 78 pivots counterclockwise in FIG. 8B, causing the Z slider 54 to move to the rear (refer to FIG. 8A). In the first cam surface 70, the second actuating surface 70b comes in sliding contact with the first passive surface 75a of the first pressure receiving surface 75.

When the Z slider 54 moves to the rear, the drive end sections 50a of the rotating shaft member 50 also moves to the rear, so that the rotating shaft member 50 rotates in the direction for moving the pressing pieces 52 downward (refer to FIG. 5B). As a result, the receiving pieces 40 are subjected to the pressing action by the pressing pieces 52, causing the keytop 22 to move downward together with the pressing pieces 52 against the urging force of the rubber dome 41.

At the 270-degree position, the X slider 72 is in the leftmost position, as illustrated in FIG. 8A and FIG. 9D. Hence, the link arm 78 reaches a position where the link arm 78 has pivoted fully counterclockwise in FIG. 8A, and the Z slider 54 reaches the rearmost position.

In this state, as with the case of the zero-degree position, the drive end sections 50a of the rotating shaft member 50 are in the positions where the drive end sections 50a have been moved to the rearmost position by the Z slider 54, as illustrated in FIG. 5B. The keytops 22 are held in the depressed position where the receiving pieces 40 have been depressed by the pressing pieces 52. Hence, the upper surfaces 22a of the keytops 22 are in the positions flush with or slightly lower than the upper surface of the frame 24, and the upper surface of the keyboard assembly 20 is configured on a plane.

In the range from the 270-degree position to the 360-degree position, the idling surface 70c of the first cam surface 70 of the cylindrical cam member 66 comes in sliding contact with the idling surface 75b of the first pressure receiving surface 75 of the X slider 72, as is obvious from FIG. 9D. Further, the second idling surface 71d of the second cam surface 71 comes in sliding contact with the idling surface 76b of the second pressure receiving surface 76. Therefore, even when the hinge chassis 64 pivots and the cylindrical cam member 66 rotates, the X slider 72 will not slide in the lateral direction. Thus, the position of the Z slider 54 remains unchanged (refer to FIG. 8A), so that the keytops 22 are held in the depressed position, as illustrated in FIG. 5B. Accordingly, the upper surface 16a of the main unit chassis 16, which becomes the rear surface in the tablet PC mode, is configured to be a flat plate that does not have irregularities attributable to the keytops 22. This prevents the keyboard assembly 20 from being in the way when the electronic apparatus 10 is used as the tablet PC.

Meanwhile, when the display chassis 14 in the 360-degree position pivots in the closing direction, an operation that reverses the operation of pivoting in the opening direction described above is performed. More specifically, as the display chassis 14 pivots from the 360-degree position to the 180-degree position via the 270-degree position, the second actuating surface 70b of the first cam surface 70 comes in sliding contact with and presses the first passive surface 75a of the first pressure receiving surface 75. Hence, the X slider 72 moves to the right again against the urging force of the auxiliary elastic member 80, thus causing the link arm 78 to pivot clockwise in FIG. 8A and the Z slider 54 to move toward the front. At this time, the Z slider 54 smoothly moves to the front, being subjected to the urging force from the rubber dome 41. As a result, the keytops 22 are returned to the uppermost use position.

In the range from the 180-degree position to the 70-degree position, the keytops 22 are maintained in the use position. Then, as the display chassis 14 pivots from the 70-degree position to the zero-degree position, the first actuating surface 71a of the second cam surface 71 comes in sliding contact with and presses the first passive surface 76a of the second pressure receiving surface 76. Therefore, the X slider 72 now moves to the left against the urging force from the rubber dome 41, so that the Z slider 54 moves to the rear, causing the rotating shaft member 50 to rotate in the direction for the pressing pieces 52 to depress the receiving pieces 40. At this time, the X slider 72 smoothly moves to the left, being subjected to the urging force of the auxiliary elastic member 80. As a result, the keytops 22 reach the position flush with or slightly lower than the upper surface of the frame 24, thus enabling the display chassis 14 to be closed without causing interference between the display 18 and the keytops 22.

As described above, in the electronic apparatus 10, the key depressing mechanism 26 and the link mechanism 56 constitute the projecting/retracting mechanism, which causes the keytops 22 to project and retract in relation to the upper surface 16a of the main unit chassis 16 in synchronization with the pivoting motions of the main unit chassis 16 and the display chassis 14 performed through the hinge mechanism 12.

Thus, the electronic apparatus 10 according to the present disclosure includes the main unit chassis 16 having the keytops 22, which are the movable members provided to be projectable and retractable in relation to the upper surface 16a, which is the outer surface of the electronic apparatus 10, and the display chassis 14 pivotably connected with the main unit chassis 16 by the hinge mechanism 12. The electronic apparatus 10 includes the rubber domes 41, which are the elastic members that urge the keytops 22 in the direction for projecting from the upper surface 16a. The electronic apparatus 10 has the key depressing mechanism 26 and the link mechanism 56 constituting the projecting/retracting mechanism, which has the X slider 72, which is a sliding member that slides in the main unit chassis 16 in synchronization with the pivoting motions of the main unit chassis 16 and the display chassis 14. The projecting/retracting mechanism causes the keytops 22 to retract (descend) from the upper surface 16a against the urging force of the rubber domes 41 if the X slider 72 slides in one direction (to the left in FIG. 8B), or causes the keytops 22 to project (ascend) from the upper surface 16a if the X slider 72 slides in the opposite direction, i.e. the other direction (to the right in FIG. 8A). The electronic apparatus 10 includes the auxiliary elastic member 80, which urges the X slider 72 in the direction for the X slider 72 to slide in one direction (to the left in FIG. 8A).

According to the electronic apparatus 10, therefore, when opening or closing the display chassis 14 with respect to the main unit chassis 16, the keytops 22, which are the movable members, can be set in the use position or the depressed position by the X slider 72, which is moved by the cylindrical cam member 66. At this time, to depress the keytops 22 to the depressed position, the plurality of the keytops 22 have to be depressed to the depressed position against the urging force of the rubber domes 41. For this purpose, the electronic apparatus 10 according to the present disclosure is provided with the auxiliary elastic member 80, which urges the X slider 72 in the direction for canceling out the urging force from the rubber domes 41. More specifically, the X slider 72 is continually urged in the direction for depressing the keytops 22 by the auxiliary elastic member 80. This makes it possible to reduce the load applied to the key depressing mechanism 26 and the link mechanism 56 when the keytops 22 descend. For the keytops 22 to ascend, the X slider 72 has to be slid against the urging force of the auxiliary elastic member 80. At the time of the ascent, the urging force of the auxiliary elastic member 80 can be canceled out by the urging force from the rubber domes 41. As a result, damage or malfunction of the mechanism parts constituting the key depressing mechanism 26 and the link mechanism 56 can be suppressed without increasing the size or strength of the components. Thus, the electronic apparatus 10 enables the main unit chassis 16 to be thinner and smaller.

According to the present disclosure, the link mechanism 56 constituting the projecting/retracting mechanism has the cylindrical cam member 66, which is coaxially disposed on the outer peripheral surface of the first shaft 62 and is rotatable with respect to the first shaft 62, which is provided to be integrally rotatable with the hinge chassis 64 with respect to the first shaft 62, which is provided with the first cam surface 70 on one end and which is provided with the second cam surface 71 on the other end; and the cylindrical connecting section 74, which is provided to be slidable integrally with the X slider 72, which is coaxially disposed to be movable in the axial direction with respect to the first shaft 62 on the outer peripheral surface of the first shaft 62, and which is provided with the first pressure receiving surface 75 that can be in sliding contact with the first cam surface 70 and the second pressure receiving surface 76 that can be in sliding contact with the second cam surface 71.

Thus, the electronic apparatus 10 is configured such that the cylindrical cam member 66 and the cylindrical connecting section 74 of the X slider 72 are coaxially disposed on the outer peripheral surface of the first shaft 62, and a load is transmitted through the first cam surface 70 and the second cam surface 71 and the first pressure receiving surface 75 and the second pressure receiving surface 76, which are provided on the end surfaces of the cylindrical cam member 66 and the cylindrical connecting section 74, respectively. This configuration makes it possible to secure a sufficient area of contact between the first cam surface 70 and the second cam surface 71 and the first pressure receiving surface 75 and the second pressure receiving surface 76, thus preventing wear on or damage to these surfaces. Thus, the load taking place between the cylindrical cam member 66 and the cylindrical connecting section 74 of the X slider 72 can be securely received. Further, even if the first shaft 62 is formed to have an extremely small diameter, a sufficient area of contact between the first cam surface 70 and the second cam surface 71 and the first pressure receiving surface 75 and the second pressure receiving surface 76 can be secured, thus enabling the device to be made smaller.

Figure 10:
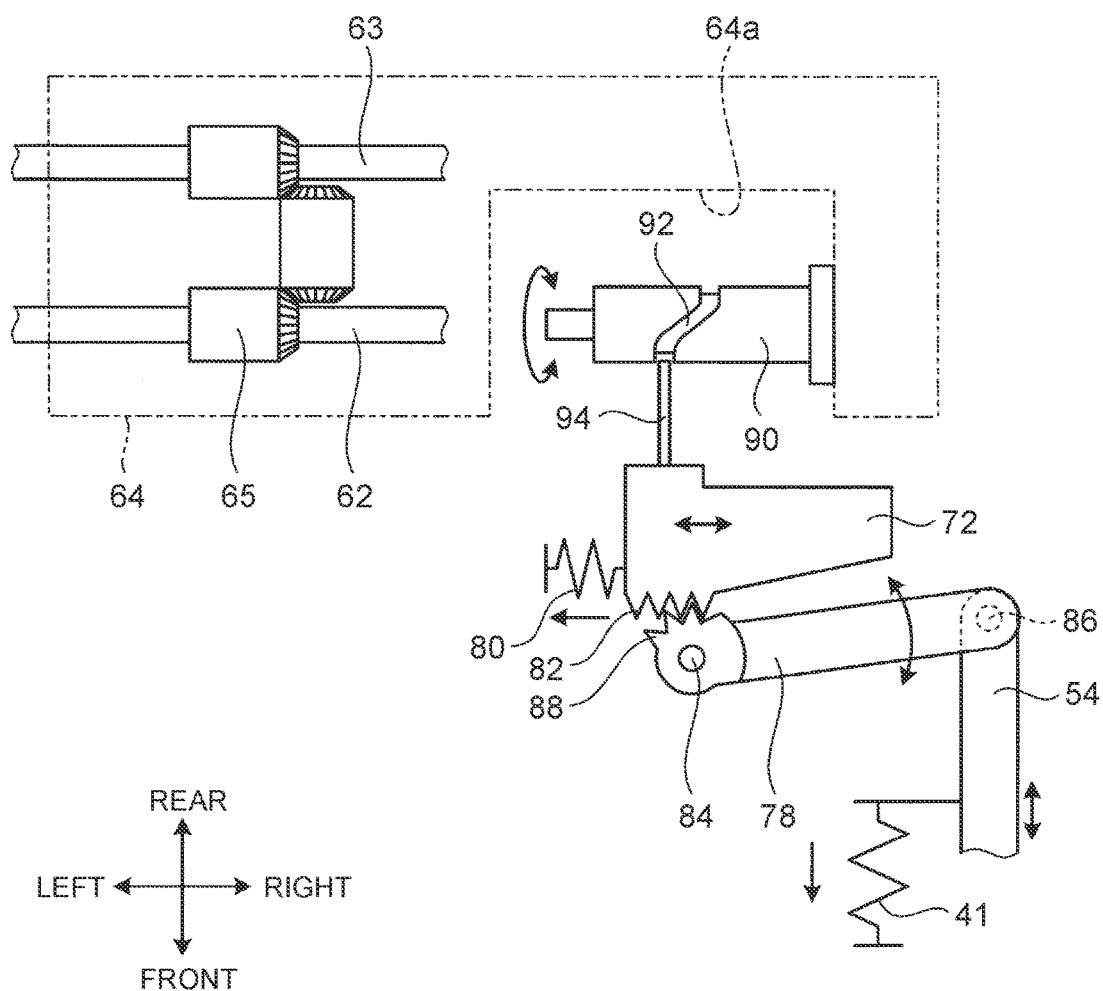
FIG. 10 is a plan view schematically illustrating the configuration of a modification example of a link mechanism.

The link mechanism 56 for transmitting the rotation of the hinge mechanism 12 to the keytops 22, which are the movable members, may have a different configuration from the one using the cylindrical cam member 66 and the cylindrical connecting section 74. For example, a configuration may be used, in which a spiral pin 90, which rotates coaxially with the first shaft 62, is provided on one side surface of a recessed section 64a of the hinge chassis 64, as illustrated in FIG. 10. In this configuration, a spiral rail groove 92, which indicates the slide track of the X slider 72 in the lateral direction based on the rotation of the hinge mechanism 12, is formed in the outer peripheral surface of the spiral pin 90. An engaging piece 94, which replaces the cylindrical connecting section 74 of the X slider 72, slidably engages with the rail groove 92. With this arrangement, the same operations as those performed by the configuration using the cylindrical cam member 66 and the cylindrical connecting section 74 can be accomplished.

The present invention is not limited to the disclosed contents described above and can, of course, be freely modified within the scope that does not depart from the spirit of the present invention.

The present disclosure has illustrated the configuration in which the keytops 22 are in the depressed position in the range from the zero-degree position to the 70-degree position and in the range from the 180-degree position to the 360-degree position, and the keytops 22 are in the use position in the range from the 70-degree position to the 180-degree position. The relationship between the height positions of the keytops 22 and the pivoting position of the display chassis 14 may of course be changed.

In the present disclosure, the keytops 22 have been illustrated as the movable members interlocked with the slide of the X slider 72 and the Z slider 54. Other than the keytops 22, the movable member may alternatively be, for example, movable rubber legs projecting and retracting in relation to the upper surface 16a or the lower surface 16b of the main unit chassis 16, the pointing stick 20a or various types of function buttons, such as the power switch 27. Further, the elastic members, such as the rubber domes 41, which urge the movable members, may be configured to urge the movable members in either the projecting direction to project from the outer surface of the main unit chassis 16 or the retracting direction to retract thereto.

In the present disclosure, the convertible PC in which the display chassis 14 pivots from the zero-degree position to the 360-degree position with respect to the main unit chassis 16 has been illustrated as the electronic apparatus 10. However, the electronic apparatus 10 may alternatively be a laptop PC in which the display chassis 14 pivots from the zero-degree position to the 180-degree position with respect to the main unit chassis 16.

In the present disclosure, the configuration in which the X slider 72 is directly urged by the auxiliary elastic member 80 has been illustrated. Alternatively, however, a different configuration may be used, in which the auxiliary elastic member 80 indirectly urges the X slider 72 by urging the link arm 78 or the Z slider 54. The sliding direction of the X slider 72 is not limited to the lateral direction. Further, in place of the X slider 72, the Z slider 54 may be directly slid by the hinge mechanism 12.

The invention claimed is:

1. An electronic apparatus, comprising:
a first chassis having a movable member on an outer surface thereof, the movable member being configured to project or retract in relation to the outer surface;
a second chassis pivotably connected with the first chassis by a hinge mechanism;
an elastic member which is entirely between the outer surface and the moveable member and urges the movable member in a direction for projecting from the outer surface;
a projecting/retracting mechanism which has a sliding member that slides in the first chassis in synchronization with pivoting movements of the first chassis and the second chassis, and which retracts the movable member from the outer surface against an urging force of the elastic member when the sliding member slides in one direction, while projecting the movable member from the outer surface when the sliding member slides in another direction; and
an auxiliary elastic member which urges the sliding member in the one direction.

2. The electronic apparatus according to claim 1, wherein:
the first chassis has a keyboard assembly;
the second chassis has a display assembly; and
the movable member is a keytop of the keyboard assembly.

3. The electronic apparatus according to claim 2, wherein:
the hinge mechanism connects the first chassis and the second chassis to enable pivoting from a zero-degree position at which a front surface of the keyboard assembly of the first chassis and a front surface of the display assembly of the second chassis oppose each other to a 360-degree position at which a rear surface of the keyboard assembly of the first chassis and a rear surface of the display assembly of the second chassis oppose each other, and
when the keytop is in a depressed position, the keytop has retracted from the outer surface, and the electronic apparatus is at the zero-degree position and the 360-degree position, and
when the keytop is in a use position, the keytop has projected from the outer surface and is vertically movable by being elastically supported by the elastic member in a predetermined angular range set between the zero-degree position and the 180-degree position.

4. The electronic apparatus according to claim 1, wherein:
the hinge mechanism has a first shaft fixed unrotatably with respect to the first chassis, a second shaft fixed unrotatably with respect to the second chassis, and a hinge chassis which rotatably supports the first shaft and the second shaft,
the projecting/retracting mechanism includes: a cylindrical cam member which is coaxially disposed on an outer peripheral surface of the first shaft and is rotatable with respect to the first shaft, which is integrally rotatable with the hinge chassis with respect to the first shaft, and has a first cam surface on a first end and a second cam surface on a second end; and a cylindrical connecting section that is slidable integrally with the sliding member, which is coaxially disposed on the outer peripheral surface of the first shaft and movable in an axial direction with respect to the first shaft, and has a first pressure receiving surface that is configured to be in sliding contact with the first cam surface and a second pressure receiving surface that is configured to be in sliding contact with the second cam surface, and
the sliding member slides in the other direction by the first pressure receiving surface being pressed by the first cam surface of the cylindrical cam member rotating on the outer peripheral surface of the first shaft, and slides in the one direction by the second pressure receiving surface being pressed by the second cam surface of the cylindrical cam member.

5. The electronic apparatus according to claim 1, wherein:
the projecting/retracting mechanism has a second sliding member, which slides in a direction that intersects with the sliding member in synchronization with a slide of the sliding member, and a driving member, which projects and retracts the movable member in relation to the outer surface when the second sliding member slides.

6. An electronic apparatus, comprising:
a first chassis having a movable member, the movable member being configured to project or retract in relation to an outer surface;
a second chassis pivotably connected with the first chassis by a hinge mechanism;
an elastic member which urges the movable member in a direction for projecting from the outer surface;
a projecting/retracting mechanism which has a sliding member that slides in the first chassis in synchronization with pivoting movements of the first chassis and the second chassis, and which retracts the movable member from the outer surface against an urging force of the elastic member when the sliding member slides in one direction, while projecting the movable member from the outer surface when the sliding member slides in another direction; and
an auxiliary elastic member which urges the sliding member in the one direction;
wherein:
the first chassis has a keyboard assembly;
the second chassis has a display assembly;
the movable member is a keytop of the keyboard assembly;
the hinge mechanism connects the first chassis and the second chassis to enable pivoting from a zero-degree position at which a front surface of the keyboard assembly of the first chassis and a front surface of the display assembly of the second chassis oppose each other to a 360-degree position at which a rear surface of the keyboard assembly of the first chassis and a rear surface of the display assembly of the second chassis oppose each other, and
when the keytop is in a depressed position, the keytop has retracted from the outer surface, and the electronic apparatus is at the zero-degree position and the 360-degree position, and
when the keytop is in a use position, the keytop has projected from the outer surface and is vertically movable by being elastically supported by the elastic member in a predetermined angular range set between the zero-degree position and the 180-degree position.

7. An electronic apparatus, comprising:
a first chassis having a movable member, the movable member being configured to project or retract in relation to an outer surface;

a second chassis pivotably connected with the first chassis by a hinge mechanism;
an elastic member which urges the movable member in a direction for projecting from the outer surface;
a projecting/retracting mechanism which has a sliding member that slides in the first chassis in synchronization with pivoting movements of the first chassis and the second chassis, and which retracts the movable member from the outer surface against an urging force of the elastic member when the sliding member slides in one direction, while projecting the movable member from the outer surface when the sliding member slides in another direction; and
an auxiliary elastic member which urges the sliding member in the one direction;
wherein:
 the hinge mechanism has a first shaft fixed unrotatably with respect to the first chassis, a second shaft fixed unrotatably with respect to the second chassis, and a hinge chassis which rotatably supports the first shaft and the second shaft,
 the projecting/retracting mechanism includes: a cylindrical cam member which is coaxially disposed on an outer peripheral surface of the first shaft and is rotatable with respect to the first shaft, which is integrally rotatable with the hinge chassis with respect to the first shaft, and has a first cam surface on a first end and a second cam surface on a second end; and a cylindrical connecting section that is slidable integrally with the sliding member, which is coaxially disposed on the outer peripheral surface of the first shaft and movable in an axial direction with respect to the first shaft, and has a first pressure receiving surface that is configured to be in sliding contact with the first cam surface and a second pressure receiving surface that is configured to be in sliding contact with the second cam surface, and
the sliding member slides in the other direction by the first pressure receiving surface being pressed by the first cam surface of the cylindrical cam member rotating on the outer peripheral surface of the first shaft, and slides in the one direction by the second pressure receiving surface being pressed by the second cam surface of the cylindrical cam member.

* * * * *